(12) United States Patent
Macasero

(10) Patent No.: US 11,455,226 B2
(45) Date of Patent: Sep. 27, 2022

(54) UNINTERRUPTED POWER SUPPLY (UPS) WITH POWER MANAGEMENT FOR SELF-SERVICE TERMINALS (SSTS)

(71) Applicant: NCR Corporation, Atlanta, GA (US)

(72) Inventor: Roy Dominic Delima Macasero, Lapu-Lapu (PH)

(73) Assignee: NCR Corporation, Atlanta, GA (US)

( * ) Notice: Subject to any disclaimer, the term of this patent is extended or adjusted under 35 U.S.C. 154(b) by 62 days.

(21) Appl. No.: 16/905,565

(22) Filed: Jun. 18, 2020

(65) Prior Publication Data
US 2021/0397238 A1  Dec. 23, 2021

(51) Int. Cl.
| | | |
|---|---|---|
| G06F 11/30 | (2006.01) | |
| G06F 1/30 | (2006.01) | |
| G06F 1/26 | (2006.01) | |
| H02J 9/06 | (2006.01) | |
| G06F 11/32 | (2006.01) | |
| G06F 1/18 | (2006.01) | |
| G06F 13/42 | (2006.01) | |
| H04W 76/10 | (2018.01) | |
| H02J 7/00 | (2006.01) | |
| G06N 20/00 | (2019.01) | |

(52) U.S. Cl.
CPC .......... *G06F 11/3058* (2013.01); *G06F 1/189* (2013.01); *G06F 1/263* (2013.01); *G06F 1/30* (2013.01); *G06F 11/324* (2013.01); *H02J 9/062* (2013.01); *G06F 13/4282* (2013.01); *G06F 2213/0042* (2013.01); *G06N 20/00* (2019.01); *H02J 7/007* (2013.01); *H04W 76/10* (2018.02)

(58) Field of Classification Search
CPC ........ G06F 1/30; G06F 1/263; G06F 13/4282; G06F 2213/0042; G06F 11/324; G06F 11/3058; G06F 1/189; G06N 20/00; H02J 7/007; H02J 7/00712; H02J 7/042; H02J 9/06; H02J 9/062; H04W 76/10
See application file for complete search history.

(56) References Cited

U.S. PATENT DOCUMENTS

| | | | |
|---|---|---|---|
| 6,296,185 B1 * | 10/2001 | Dejaeger ................. | A47F 9/046 235/383 |
| 2004/0041021 A1 * | 3/2004 | Nugent, Jr. ............. | A47F 9/047 235/383 |

(Continued)

*Primary Examiner* — Thomas J. Cleary
(74) *Attorney, Agent, or Firm* — Schwegman, Lundberg & Woessner (57) ABSTRACT

An Uninterrupted Power Supply (UPS) is provided. The UPS comprises Alternating Current (AC) power ports, communication ports, a battery to supply Direct Current (DC) power, a display, a surge controller, a wireless transceiver, a processor, and a non-transitory computer-readable storage medium having executable instructions. The executable instructions when executed by the processor gathers coarse-grain and fine-grain power consumption metrics for a terminal plugged into an AC power port and the battery. The metrics displayed on the display and provided to user-operated devices over the wireless transceiver. User-operated devices include user interfaces that customer configure the executable instructions of the UPS for custom gathering of the metrics, custom aggregation of the metrics, custom reporting the metrics, and custom displaying of the metrics on the display.

20 Claims, 4 Drawing Sheets

(56) References Cited

U.S. PATENT DOCUMENTS

| | | | |
|---|---|---|---|
| 2005/0071699 A1* | 3/2005 | Hammond | H02J 9/062 713/300 |
| 2006/0073883 A1* | 4/2006 | Franks, Jr. | G07F 17/42 463/25 |
| 2008/0058996 A1* | 3/2008 | Sachdev | G06F 1/324 700/291 |
| 2008/0231118 A1* | 9/2008 | Roepke | G06F 1/30 307/64 |
| 2009/0150818 A1* | 6/2009 | Bakhreiba | G06F 3/04883 715/771 |
| 2011/0072292 A1* | 3/2011 | Khawand | G06F 11/3013 713/340 |
| 2012/0221161 A1* | 8/2012 | Billingsley | G01R 19/16547 700/295 |
| 2012/0331322 A1* | 12/2012 | Suzuki | G03G 15/5004 713/323 |
| 2015/0222145 A1* | 8/2015 | MacInnes | H02J 9/06 307/65 |
| 2017/0077702 A1* | 3/2017 | Hsieh | G06F 1/3209 |
| 2017/0223856 A1* | 8/2017 | Rohan | H05K 7/14 |
| 2017/0322241 A1* | 11/2017 | Tang | H02J 13/00 |
| 2018/0013318 A1* | 1/2018 | Nguyen | H02J 7/0024 |
| 2018/0233947 A1* | 8/2018 | Mills | H02J 9/06 |
| 2019/0018473 A1* | 1/2019 | Scalf | H02J 13/00026 |
| 2019/0332154 A1* | 10/2019 | Thompson | G06F 1/24 |
| 2020/0403441 A1* | 12/2020 | Fallon | H02J 7/007188 |
| 2021/0194274 A1* | 6/2021 | Nagabhushanrao | H02J 9/062 |

* cited by examiner

UNINTERRUPTED POWER SUPPLY (UPS) WITH POWER MANAGEMENT FOR SELF-SERVICE TERMINALS (SSTS)

BACKGROUND

Although power outages or voltage fluctuations are not common, when they occur, they often leave bad consequences to hardware and user experiences as a whole. Moreover, while there are a variety of UPS devices throughout the industry, these devices are often generic with limited functionality.

Most UPS devices only provide basic power connections, such as an Alternating Current (AC) plugs or Universal Serial Bus ports that supply one or more devices power when those devices are plugged into the AC plugs or USB ports. Some devices may also include a limited display, which mainly only indicates whether the device is currently providing Direct Current (DC) power during a power interruption, whether the device is currently providing pass-through AC power from an AC source, and/or the current battery charge level of the battery backup power.

SUMMARY

In various embodiments, an UPS with power management for SSTs and methods of operation are presented.

According to an aspect, a method of operating an UPS with power management for SSTs is presented. Specifically, battery metrics for a battery of an UPS are collected. Power draw metrics for a Self-Service Terminal (SST) plugged into the UPS are collected. Projected power metrics are calculated based on the battery metrics and the power draw metrics. The battery metrics, the power draw metrics, and the projected power metrics are provided to a user-operated device over a network connection between the UPS and the user-operated device. At least the projected power metrics are presented on a display of the UPS.

DETAILED DESCRIPTION

Figure 1:
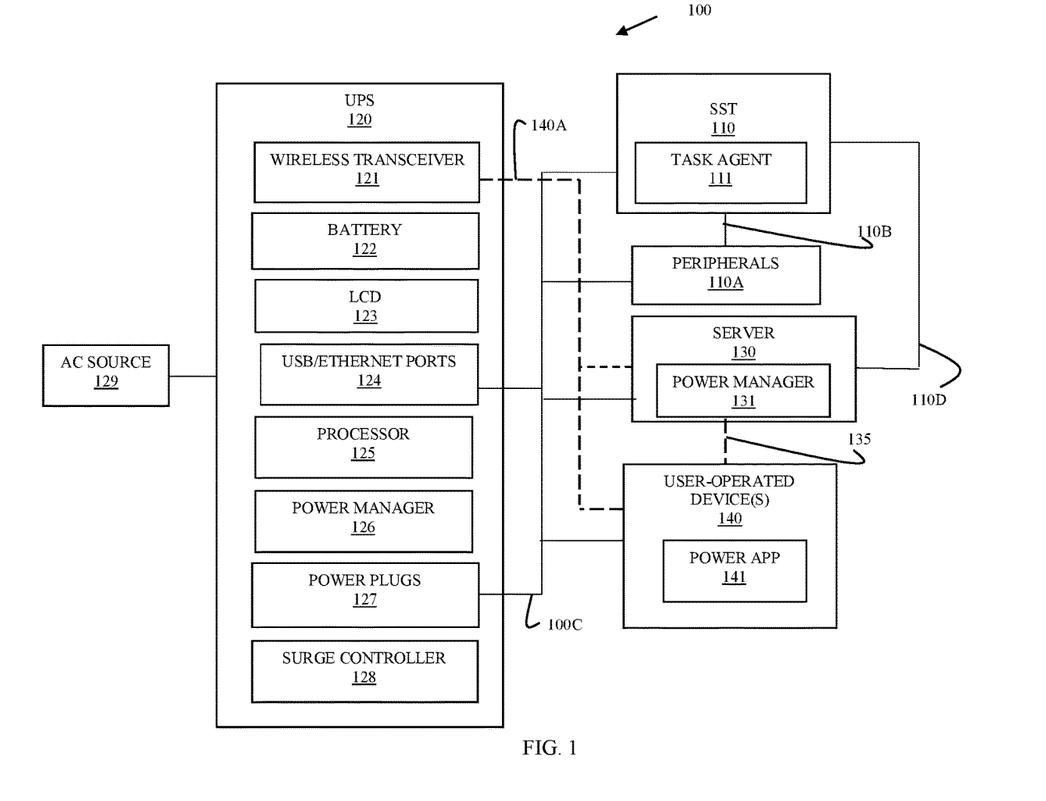
FIG. 1 is a diagram of a system for UPS with power management for an SST, according to an example embodiment.

FIG. 1 is a diagram of a system 100 for UPS with power management for an SST, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of an UPS with power management capabilities presented herein and below.

The system 100 provides an intelligent or smart and novel UPS that includes power management capabilities for an SST along with analytics regarding power usage. The novel UPS, management capabilities, and analytic capabilities are discussed in greater detail herein and below.

The system 100 comprises an SST 100, a UPS 120, a server 130, and one or more user-operated or mobile devices 140.

The SST comprises a task agent 111. It is noted that the SST comprises a plurality of other devices and hardware, which is not shown in FIG. 1, such as and by way of example only, one or more displays, a card reader, currency acceptor/dispenser, coin acceptor/dispenser, scanner, camera, microphone, speaker, keypad, weigh scale, combined weigh scale and scanner, wireless transceiver, communication ports, etc. The SST also includes a processor and a non-transitory computer-readable storage medium comprising executable instructions. The executable instructions include a variety of software such as an Operating System (OS), a transaction manager for performing transactions, and the task agent 111.

The UPS 120 comprises a wireless transceiver 121, a battery 122, a Lead Crystal Display (LCD), a plurality of ports Universal Serial Bus (USB) and Ethernet 124, a processor 125, a power manager 126, Alternating Current (AC) power plugs 127, and a surge controller 128. The UPS 120 also includes a non-transitory computer-readable storage medium having executable instructions representing the power manager 126. Power manager 126 when executed by the UPS processor from the non-transitory computer-readable storage medium causes the processor to perform the processing discussed herein and below with respect to power manager 126.

The user-operated device 140 (may also be referred to herein as "mobile device 140") comprises a power application ("app") 141. The mobile device 140 (although not shown in FIG. 1) includes a processor and a non-transitory computer-readable storage medium having executable instructions representing power app 141. Power app 141 when executed by the processor of mobile device 140 from the non-transitory computer-readable storage medium causes the processor to perform the processing discussed herein and below with respect to power app 141.

Server 130 comprises a processor and a non-transitory computer-readable storage medium having executable instructions representing power manager 131. The processor of server 130 when executing the executable instructions from the non-transitory computer-readable storage medium causes the processor to perform the processing discussed herein and below with respect to power manager 131.

UPS 120 includes a variety of wireless network connections 140A capable of connecting power manager 126 to power manager 131 of server 130 and capable of connecting power manager 126 to power app 141 of mobile device 140. UPS 120 may also include a wired network connection 100C to task agent 111 of SST 110, power manager 131 of server 130, and/or power app 141 of user-operated device 140. The wired connection may be achieved through a wired connection to ethernet port 124 and/or USB port 124.

Power app 141 of mobile device 140 may connect to power manager 131 of server 130 over a wireless connection 135.

Power manager 131 of server 130 may connect to task agent 111 of SST over a wired connection 110D.

SST 110 also includes a variety of connected peripherals 110A over a wired and/or wireless connection 110B. Peripherals 110A can include, by way of example only, a printer, a scanner, a display, a card reader, a keypad, a currency and/or coin dispenser and/or acceptor, a weigh scale, a combined scanner and weigh scale, etc.

During operation, task agent 111 collects/records software tasks (processes) that are being processed on SST 110 along with each task's unique identifier, unique process name and that task's hardware resource usage (such as processor load and memory utilization). At configured intervals of time, task agent 111 reports a list to power manager 126 and/or power manager 131; each record in the list identifying the task unique identifier for a given process of SST 110, unique process name, and corresponding average hardware usage. The list is also accompanied by a time interval from the last reporting made by task agent 111. During an interval of time during which task agent 111 is collecting process metrics for the tasks, task agent 111 maintains an average for each process's hardware resource usage that occurs for the interval of time, such that during a reporting interval process manager 126 and/or power manager 131 receives an average of hardware usage metrics over the interval of time for each task/process that was processed on SST 110 during that interval of time.

During operation, power manager 126 maintains a variety of UPS metrics with respect to battery 122, ports 124, plugs 127, AC power consumption when UPS 120 is providing passthrough AC power from AC source 129 to SST 110 and/or peripherals 110A, battery 122 charge level, battery 122 health, dates and times that surge controller 128 was triggered, date and times that AC source 129 was down and that DC power was provided from battery 122 to SST 110 and/or peripherals 110A, length of time for each incident that DC power was needed because AC power source 129 was out/down, etc. The metrics are also provided at a fine-grain level of detail, such that power consumption for a particular task/process basis, power consumption by the SST 110 only, power consumption for each peripheral 110A.

Based on current UPS metrics, power manager 126 estimates a current lifespan for battery 122, such as based on a preconfigured number of times that the battery 122 can be recharged and discharged. The current lifespan metric is maintained with the other UPS metrics.

Power manager 126 may also estimate the length of time that the battery 122 at its current charge level can supply DC power if needed to SST 110 and/or peripherals 110A. This is maintained as a current battery availability metric. Moreover, this metric many be calculated based on a current tasks/processes that are processing on the SST and their historical average hardware usage metrics.

In an embodiment, power manager 126 may utilize a trained machine learning algorithm to identify relationships/correlations between sets of tasks/processes that process on SST 110 and DC power draw when UPS 120 is providing DC power from battery 122 to SST 110 and/or peripherals 110A. That is, existing tasks/processes and power consumption are provided as input to the trained machine learning algorithm along with the battery health metrics and the actual rate of power draw and rate of battery 122 charge level decline are provided as the expected output from the trained machine learning algorithm. The algorithm then derives factors and weights between the tasks/processes and battery health in an algorithm that produce the actual rate of power draw and rate of battery charge level decline. One the algorithm is trained it can be used to predict a length of time that will drain the battery 122 of DC power and use this information to determine a current length of time power draw metric when the UPS 120 is providing passthrough AC power or when the UPS 120 is providing DC power from the battery 122 during times of outage with the AC source 129. The trained machine-learning algorithm can also be trained for providing similar metrics based on the peripherals 110A.

In an embodiment, power manager 126 offloads logs of the metrics to power manager 131 for storage and further analysis and analytics.

Power manager 126 may also display any of the gathered metrics and/or custom aggregations of the metrics on LCD 123. In an embodiment, LCD 123 includes a touch-screen interface that permits a user to toggle through different metrics and/or select particular metrics or aggregations of metrics for presentation on the LCD.

User-operated device 140 may connect to UPS 120 over a wireless connection 140A using wireless transceiver 121. Device 140 may also connect to UPS 120 over a wired connection 100C. Power app 141 includes a user-facing interface to power manager 126, permitting user-defined metrics, all current metrics, or metrics within a user-defined period of time to be delivered from power manager 126 to power app 141 for viewing by the user on a display of device 140. The user-facing interface may include an administrative interface to power manager 126, which permits the user through power app 141 to custom define metrics captured by power manager 126 and/or set triggers that report user-defined sets of metrics from power manager 126 to power app 141 automatically (dynamically pushed from power manager 126 to power app 141 based on a trigger event). The triggers may also be user-defined through the user-facing interface for such things as a set time of day, a set day of week, a set recurring day or days of each month, a particular battery health metric, when the UPS 120 is detected as switching from AC power passthrough to DC power, when the current charge level of the battery i122 s below a user-defined threshold, when an expected length of time that the battery 122 can sufficiently supply power to SST 110 and/or peripherals 110A drops below a user-defined threshold, and other user-defined triggers.

In an embodiment, power app 141 utilizes a user-facing interface to power manager 131 of server 130. Here device 140 may connect to server 130 over a wireless connection 135. Device 140 may also connect via a wired connection 100C to server 130. The above-noted discussion of obtaining and displaying metrics for UPS 120 may be obtained by power app 141 through power manager 131 of server 130. Power app 141 may also use the user-facing interface to power manager 131 to configure custom metrics and custom define triggers for reporting metrics. In this case, power manager 131 utilizes an Application Programming Interface (API) to interact with power manager 126.

In an embodiment, power manager 126 can also be configured as to determine when charging of battery 122 is to be initiated. For example, when a charge level of battery 122 falls below 75%, charging is initiated of battery 122 utilizing AC power source 129. This is to prevent damage and wear and tear on battery 122. Again, the threshold charge level of battery 122 for which charging is initiated can be user configured through either power manager 131 and/or power app 141. In an embodiment, power manager 131 maintains historical metrics for a plurality of UPSs 120 and their set charge level for which charging of the corresponding battery 122 is initiated and determines an optimal charge level for a given type of battery 122 and/or UPS 120 for which the threshold is set.

In an embodiment, the UPS metrics collected also indicate whether the metrics collected are associated with an indication as to whether any particular metric collected is for when the UPS 120 is providing passthrough AC power or when the UPS 120 is providing DC power during an AC power outage.

In an embodiment, the UPS metrics are captured in logs on UPS 120 at configurable intervals of time and/or based on an event, such as when the UPS 120 switching from AC passthrough power to DC provided power from the battery, when a given peripheral 110A is plugged into power plugs 127, when a given peripheral 110A is unplugged from power plugs 127, when a given peripheral 110A is plugged into a USB port 124, when a given peripheral 110A is unplugged from a USB port 124, when a charge level for battery 122 changes, when UPS 120 is restored following a surge that activated surge controller 128 to cut off power, and/or other user-defined events.

In an embodiment, one or more of peripherals 110A receive DC backup power when the AC source is out/down through USB ports 124.

In an embodiment, SST 110 is configured in a mode of operation that is cashier-assisted where a cashier assists a customer in performing a checkout. In this embodiment, SST 110 is configured to switch from a self-service mode of operation to a cashier-assisted mode of operation.

In an embodiment, user-operated devices 140 comprise, phones, tablets, wearable processing devices, laptops, and/or desktops.

In an embodiment, power app 141 does not directly connect and interact with power manger 126 of UPS 120; rather, power app 141 connects and interacts with power manager 131 and power manager 131 directly interacts with power manager 126 through an API on behalf of power app 141. So, power manager 131 serves or acts as a proxy between user-operated device 140 and UPS 120.

System 100 provides an intelligent UPS device 120 that collects coarse-grain and fine-grain metrics on power draw by devices, battery health, battery charge level, expected remaining battery charge time available, percent of battery usage per task/process, per peripheral device 110A, and other metrics as discussed above. Moreover, UPS 120 provides an interface for interacting with user-operated devices 140 and/or server 130.

These and other embodiments are now discussed with reference to FIGS. 2-4.

Figure 2:
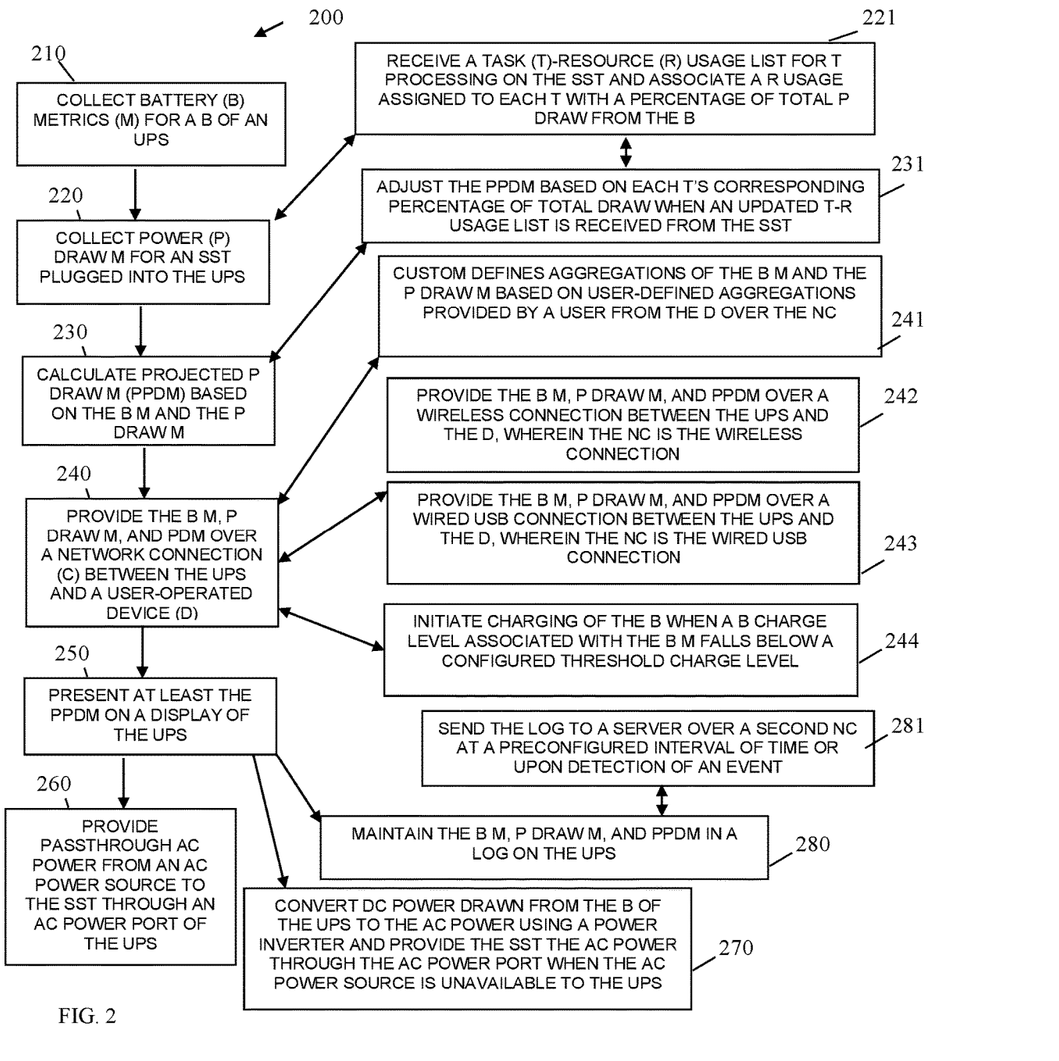
FIG. 2 is a diagram of a method for operating a UPS with power management for an SST, according to an example embodiment.

FIG. 2 is a diagram of a method 200 for operating a UPS with power management for an SST, according to an example embodiment. The software module(s) that implements the method 200 is referred to as an "UPS power manager." The UPS power manager is implemented as executable instructions programmed and residing within memory and/or a non-transitory computer-readable (processor-readable) storage medium and executed by one or more processors of a device. The processor(s) of the device that executes the UPS power manager are specifically configured and programmed to process the UPS power manager. The UPS power manager has access to one or more network connections during its processing. The network connections can be wired, wireless, or a combination of wired and wireless.

In an embodiment, the device that executes the UPS power manager is UPS 120.

In an embodiment, the UPS power manager is power manager 126.

At 210, the UPS power manager collects battery metrics for a battery of an UPS. These metrics were discussed above and can include a health or status of the battery including a current battery charge level, a running total for a total number of times that the battery has been charged, a running total for a total number of times that the battery was used for supplying power to a connected or plugged in SST and/or peripherals of the SST, an indication as to whether the UPS is currently converting DC power to AC power and providing power to the SST and/or peripherals, and other metrics.

At 220, the UPS power manager collect power draw metrics for an SST plugged into the UPS. The power draw metrics can include rates that the battery loses power when the UPS is converting DC power to AC power, an indication for each rate as to which devices the rates apply such as the SST and each peripheral of the SST, etc.

In an embodiment, at 221, the UPS power manager receives a task-resource usage list for a task processing on the SST and associates a resource usage assigned to each task with a percentage of a total power draw metric from the battery. That is, each task of the SST is reported by the SST to be consuming a certain percentage of the SST's processor and memory. That hardware usage for a given task is correlated as a percentage of total power draw for the battery.

At 230, the UPS power manager calculates a projected power draw based on the battery metrics and the power draw metrics. The projected power draw calculated may remain stable when the UPS is providing passthrough AC power to the SST and/or peripherals of the SST as long as the charged battery level for the battery remains unchanged. The projected power draw calculated may be dynamically recalculated when the charged battery level changes and/or when the UPS is providing converted DC power to the SST and/or peripherals when an AC power source is out or unavailable.

In an embodiment of 221 and 230, at 231, the UPS power manager adjusts the projected power draw metric that is calculated based on each task's corresponding percentage of total draw when an updated task-resource usage list is received from the SST. In other words, a state or context of what the SST is processing can alter and change the projected power draw metric. More hardware resource intensive tasks processing on the SST will cause the UPS power manager to recalculate the projected power draw metric to indicate, as an example, that based on a current state of the SST, the battery will be depleted in a shorter period of time than what was previously predicted for the battery.

At 240, the UPS power manager provides the battery metrics, the power draw metrics, and the current projected power draw metric over a network connection between the UPS and a user-operated device.

In an embodiment, at 241, the UPS power manager custom defines aggregations of the battery metrics and the power draw metrics based on user-defined aggregations provided by a user through a user-facing interface of the user-operated device over the network connection.

In an embodiment, at 242, the UPS power manager provides the battery metrics, the power draw metrics, and the projected power metrics over a wireless connection between the UPS and the user-operated device, the network connection of 240 is a wireless network connection.

In an embodiment, at 243, the UPS power manager provides the battery metrics, the power draw metrics, and the projected power draw metrics over a wired USB connection between the UPS and the user-operated device, the network connection of 240 is a wired USB connection.

In an embodiment, at 244, the UPS power manager initiates charging of the UPS battery when a charge level associated with the battery falls below a configured threshold charge level.

At 250, the UPS power manager presents at least the projected power draw metric on a display of the UPS. A variety of other customized battery metrics and battery draw metrics may also simultaneously be presented on a display of the UPS.

In an embodiment, at 260, the UPS power manager provides passthrough AC power from an AC power source to the SST through an AC power port of the UPS.

In an embodiment, at 270, the UPS power manager converts DC power drawn from the batter of the UPS to the AC power using a power inverter and provides the SST the AC power through the AC power port when the AC power source of the UPS is unavailable to the UPS.

In an embodiment, at 280, the UPS power manager maintains the battery metrics, the power draw metrics, and the projected power draw metric in one or more logs on the UPS.

In an embodiment of 280, at 281, the UPS power manager sends the one or more logs to a server over a second network connection at preconfigured intervals of time or upon detection of an event (example events presented above with the discussion of system 100). The second network connection can be a wired Ethernet connection or a wireless connection between the server and the UPS.

Figure 3:
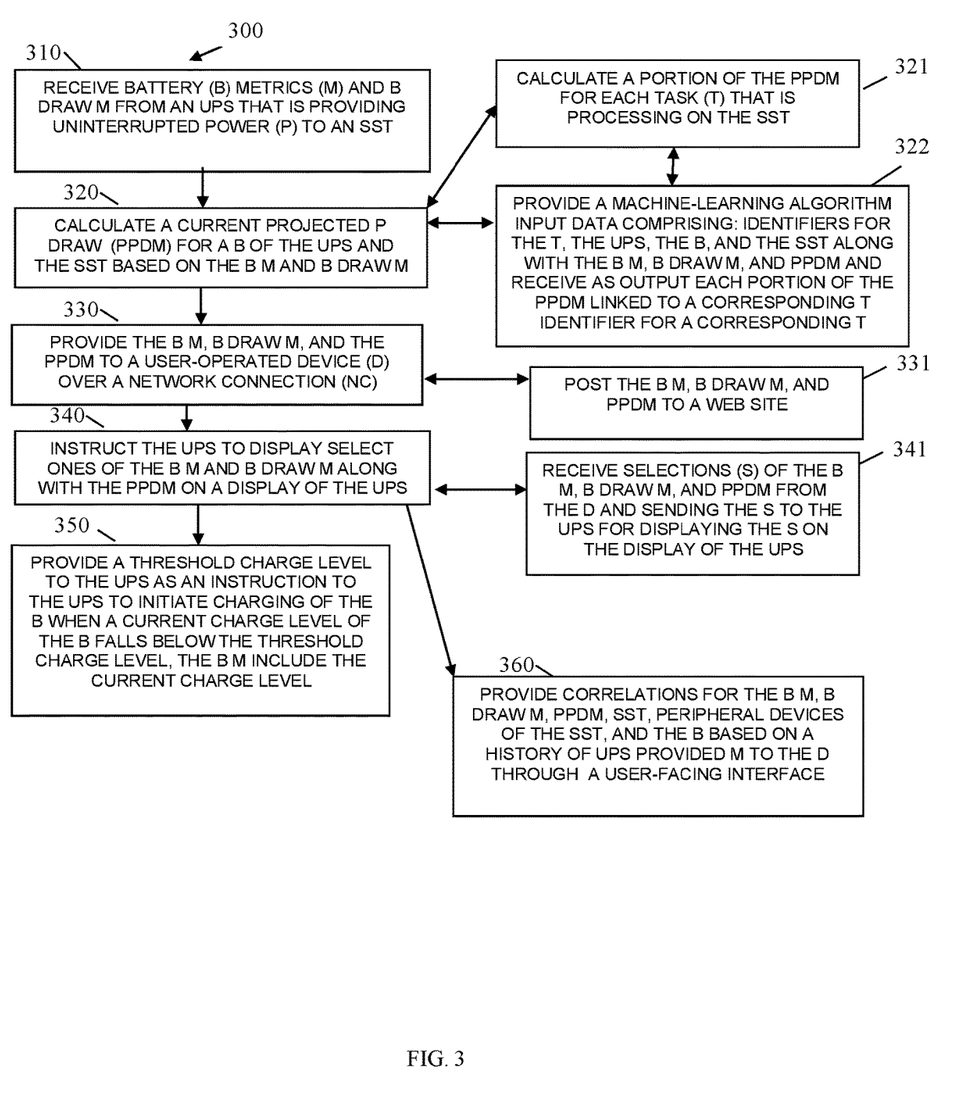
FIG. 3 is a diagram of another method for operating a UPS with power management for an SST, according to an example embodiment.

FIG. 3 is a diagram of another method 300 operating a UPS with power management for an SST, according to an example embodiment. The software module(s) that implements the method 300 is referred to as a "server-based UPS power manager." The server-based UPS power manager is implemented as executable instructions programmed and residing within memory and/or a non-transitory computer-readable (processor-readable) storage medium and executed by one or more processors of a device. The processors that execute the server-based UPS power manager are specifically configured and programmed to process the server-based UPS power manager. The server-based UPS power manager has access to one or more network connections during its processing. The network connections can be wired, wireless, or a combination of wired and wireless.

In an embodiment, the device that executes the server-based UPS power manager is server 130. In an embodiment, the server 130 is a cloud processing environment (cloud) that comprises multiple servers cooperating with one another as a single server.

In an embodiment, the server-based UPS power manager is power manager 131.

At 310, the server-based UPS power manager receives battery metrics and battery/power draw metrics from an UPS that is providing uninterrupted power to an SST.

At 320, the server-based UPS power manager calculates a current projected power draw for a battery of the UPS and the SST based on the battery metrics and the battery draw metrics.

In an embodiment, at 321, the server-based UPS power manager calculates a portion of the current projected power draw metrics for each task that is processing on the SST.

In an embodiment of 320 and 321, at 322, the server-based UPS power manager provides a machine-learning algorithm input data comprising identifiers for the tasks, the UPS, the battery, and the SST along with the battery metrics, the battery draw metrics, and the projected power draw metric. The machine-learning algorithm provides as output data each portion of the projected power draw metric linked to a corresponding task identifier for a corresponding task. That is, each task may be associated with a specific percentage of the overall projected power draw metric.

At 330, the server-based UPS power manager provides the battery metric, the battery draw metrics, and the projected power draw metric to a user-operated device over a network connection. The network connection can be a wired connection, a wireless connection, or a combination of a wired and wireless connection.

In an embodiment, at 331, the server-based UPS power manager posts the battery metrics, the battery draw metrics, and the projected power draw metric to a web site or on-line portal.

At 340, the server-based UPS power manager instructs the UPS to display select ones of the battery metrics, the battery draw metrics along with the projected power draw metric on a display of the UPS.

In an embodiment, at 341, the server-based UPS power manager receives selections of the battery metrics, the battery draw metrics, and the projected power draw metric from the user-operated device and the server-based UPS power manager sends the selection to the UPS for displaying the selections on the display of the UPS.

In an embodiment, at 350, the server-based UPS power manager provides a threshold charge level to the UPS as an instruction to the UPS to initiate charging of the battery when a current charge level of the battery falls below the threshold charge level; the battery metrics include the current charge level.

In an embodiment, at 360, the server-based UPS power manager provides correlations between the battery metrics, the battery draw metrics, the projected power draw metric, the SST, peripheral devices of the SST, and the battery based on a history of UPS provided metrics to the user-operated device through a user-facing interface.

Figure 4:
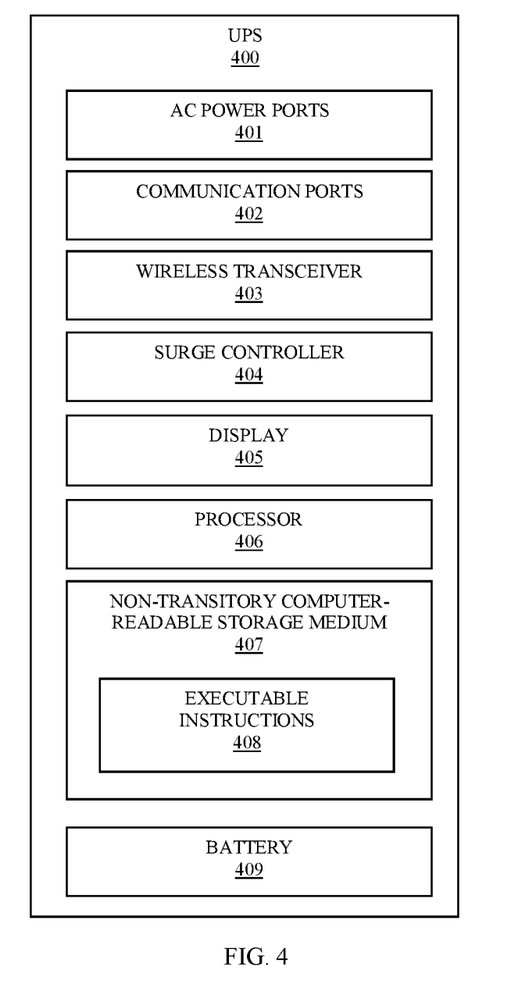
FIG. 4 is a diagram of an UPS with power management for an SST, according to an example embodiment.

FIG. 4 is a diagram of an UPS 400 with power management for an SST, according to an example embodiment. The UPS 400 includes a variety of hardware components and software components. The software components of the UPS 400 are programmed and reside within memory and/or a non-transitory computer-readable medium and execute on one or more processors of the UPS 400. The UPS 400 communicates over one or more networks, which can be wired, wireless, or a combination of wired and wireless.

In an embodiment, the UPS 400 implements, inter alia, the processing described above with respect to some aspects of system 100, method 200, and some aspects of method 300.

The UPS 400 is the UPS 120.

The UPS 400 includes AC power ports 401, communication ports 402, a wireless transceiver 403, a surge controller 404, a display 405, a battery 405, a battery 409, a processor 406, and a non-transitory computer-readable storage medium 407 comprising executable instructions 408.

The surge controller 404 configured to cut power to a connected SST and the UPS 400 when a power surge is detected by breaking a power circuit to an AC power source.

The executable instructions 408, when executed by the processor 406 of the UPS 400, is configured to cause the processor 406 to perform operations comprising: 1) maintaining battery metrics and battery draw metrics for the battery 409; 2) calculating a current projected power draw metric based at least in part on the battery metrics and the battery draw metrics; 3) establish a wireless connection with a user-operated device through the wireless transceiver 403; 4) providing uninterrupted backup power to a SST that is plugged into one of the AC power ports 401 when an AC power source is out through the battery 409; 5) displaying select ones of the battery metrics, battery draw metrics, and the current projected power draw metric on the display 405; and 6) providing the battery metrics, the battery draw metrics, and the current projected power drawn metric to a server over a wired connection to the server through one of the communication ports 402.

In an embodiment, the executable instructions 408, when executed by the processor 406 of the UPS 400, is further configured to cause the processor 406 to perform additional operations/processing comprising: 7) setting an initiate battery charging threshold received from the user-operated device or the server; and 8) initiating charging of the battery 409 when a current charge level of the battery 409 falls below the battery charging threshold, wherein the current charge level of the battery 409 is included in the battery metrics.

In an embodiment, executable instructions 408 are all, or some combination of, power manager 126 and/or method 200.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    collecting battery metrics for a battery of an Uninterrupted Power Supply (UPS);
    collecting power draw metrics for a Self-Service Terminal (SST) plugged into the UPS;
    maintaining an average hardware usage per task-resource of the SST, wherein the average hardware usage per task-resource is an average processor load and average memory utilization per task-resource;
    calculating projected power draw metrics based on the battery metrics and the power draw metrics;
    providing the battery metrics, the power draw metrics, the average hardware usage per task-resource, and the projected power draw metrics to a user-operated device over a network connection between the UPS and the user-operated device; and
    presenting at least the projected power draw metrics along with the average hardware usage per task-resource on a display of the UPS.

2. The method of claim 1 further comprising, providing passthrough Alternating Current (AC) power from an AC power source to the SST through an AC power port of the UPS.

3. The method of claim 2 further comprising, converting Direct Current (DC) power drawn from the battery of the UPS to additional AC power using a power inverter and providing the SST the additional AC power through the AC power port when the AC power source is unavailable to the UPS.

4. The method of claim 1 further comprising, maintaining the battery metrics, the power draw metrics, and the projected power draw metrics in a log on the UPS.

5. The method of claim 4, wherein maintaining further includes sending the log to a server over a second network connection at a preconfigured interval of time or upon detection of an event.

6. The method of claim 1, collecting battery metrics for the battery further includes receiving a task-resource usage list for tasks processing on the SST and associating a resource usage assigned to each task with a percentage of a total power draw from the battery based on the corresponding average hardware usage per task-resource for the corresponding task.

7. The method of claim 6, wherein calculating further includes adjusting the projected power draw metrics based on each task's corresponding percentage of total draw when an updated task-resource usage list is received from the SST.

8. The method of claim 1, wherein providing further includes custom defining aggregations of the battery metrics and the power draw metrics based on user-defined aggregations provided by a user from the user-operated device over the network connection.

9. The method of claim 1, wherein providing further includes providing the battery metrics, the power draw metrics, and the projected power draw metrics over a wireless connection between the UPS and the user-operated device, wherein the network connection is the wireless connection.

10. The method of claim 1, wherein providing further includes providing the battery metrics, the power draw metrics, the average hardware usage per task-resource,and the projected power draw metrics over a wired Universal Serial Bus (USB) connection between the UPS and the user-operated device, wherein the network connection is the wired USB connection.

11. The method of claim 1, wherein providing further includes initiating charging of the battery when a battery charge level associated with the battery metrics falls below a configured threshold charge level.

12. A method, comprising:
    receiving battery metrics and battery draw metrics from an Uninterrupted Power Supply (UPS) that is providing uninterrupted power to a Self-Service Terminal (SST);
    obtaining an average hardware usage per task-resource of the SST, wherein the average hardware usage per task-resource is an average processor load and average memory utilization per task-resource;
    calculating a current projected power draw metric for a battery of the UPS and the SST based on the battery metrics and the battery draw metrics;
    providing the battery metrics, the battery draw metrics, the average hardware usage per task-resource, and the current projected power draw metric to a user-operated device over a network connection; and instructing the UPS to display select ones of the battery metrics and the battery draw metrics along with the current projected power draw metric on a display of the UPS.

13. The method of claim 12, wherein calculating further includes calculating a portion of the current projected power draw metric for each task that is processing on the SST based at least in part on the corresponding average hardware usage for the corresponding task-resource associated with the corresponding task.

14. The method of claim 13, wherein calculating further includes providing a machine-learning algorithm input data comprising identifiers for the tasks, the UPS, the battery, and the SST along with the battery metrics, the battery draw metric, and the current projected power draw metric and receiving as output each portion of the current projected power draw metric linked to a corresponding task identifier for a corresponding task.

15. The method of claim 12, wherein providing further includes posting the battery metrics, the battery draw metrics, the average hardware usage per task-resource, and the current projected power draw metric to a web site.

16. The method of claim 12, wherein instructing further includes receiving selections of the battery metrics, the battery draw metrics, and the current projected power draw metric from the user-operated device and sending the selections to the UPS for displaying the selections on the display of the UPS.

17. The method of claim 12 further comprising, providing a threshold charge level to the UPS as an instruction to the UPS to initiate charging of the battery when a current charge level of the battery falls below the threshold charge level, wherein the battery metrics include the current charge level.

18. The method of claim 12 further comprising, providing correlations between the battery metrics, the battery draw metrics, the current projected power draw metric, the SST, peripheral devices of the SST, the average hardware usage per task-resource, and the battery based on a history of UPS provided metrics to the user-operated device through a user-facing interface.

19. An Uninterrupted Power Supply (UPS), comprising:
alternating current (AC) power ports;
communication ports;
a wireless transceiver;
a surge controller;
a display;
a battery;
a processor;
a non-transitory computer-readable storage medium comprising executable instructions; and
the executable instructions when executed by the processor from the non-transitory computer-readable storage medium cause the processor to performing processing comprising:
maintaining battery metrics and battery draw metrics;
calculating a current projected power draw metric based at least in part on the battery metrics and the battery draw metrics;
maintaining an average hardware usage per task-resource of a Self-Service Terminal SST wherein the average hardware usage per task-resource is an average processor load and average memory utilization per task-resource
establish a wireless connection with a user-operated device through the wireless transceiver;
providing uninterrupted backup power to the SST that is plugged into one of the AC power ports when an AC power source is unavailable using the battery to provide the uninterrupted backup power;
displaying select ones of the battery metrics, battery draw metrics, the average hardware usage per task-resource, and the current projected power draw metric on the display; and
providing the battery metrics, the battery draw metrics, the average hardware usage per task-resource, and the current projected power drawn metric to a server over a wired connection to the server through one of the communication ports.

20. The UPS of claim 19, wherein the executable instructions when executed by the processor from the non-transitory computer-readable storage medium further cause the processor to performing additional processing comprising;
setting an initiate battery charging threshold received from the user-operated device or the server; and
initiating charging of the battery when a current charge level of the battery falls below the battery charging threshold, wherein the current charge level of the battery is included in the battery metrics.

* * * * *